April 20, 1965     A. A. L. CHANEAC ETAL     3,179,432
FLUID SUSPENSION

Filed Dec. 27, 1960     2 Sheets-Sheet 1

INVENTORS
ANDRE ALAIN LUDOVIC CHANEAC
HENRI GASTON CHANEAC

BY   *Imirie and Smiley*
ATTORNEYS

April 20, 1965   A. A. L. CHANEAC ETAL   3,179,432
FLUID SUSPENSION
Filed Dec. 27, 1960   2 Sheets-Sheet 2

INVENTORS
ANDRE ALAIN LUDOVIC CHANEAC
HENRI GASTON CHANEAC

BY   *Imirie and Smiley*

ATTORNEYS

United States Patent Office 3,179,432
Patented Apr. 20, 1965

3,179,432
FLUID SUSPENSION
André Alain Ludovic Chaneac and Henri Gaston Chaneac, both of Faubourg St. Didier, Aubenas, France
Filed Dec. 27, 1960, Ser. No. 78,465
Claims priority, application France, Dec. 24, 1959, 814,112, Patent 1,243,693; Apr. 25, 1960, 825,242, Patent 77,592; Dec. 1, 1960, 845,639, Patent 78,770; Dec. 20, 1960, 847,522, Patent 1,276,461
8 Claims. (Cl. 280—6)

The present invention relates generally to vehicle suspension systems, and more particularly to fluid suspension systems for automatically maintaining a vehicle at an adjustable level.

It is well known in the prior art to provide fluid suspension systems of the piston and cylinder type wherein the cylinder is connected with the vehicle chassis and the piston is connected, by means of a rod, to a wheel of the vehicle. The piston divides the cylinder into a pair of compression chambers that are connected with fluid pressure supply and return ducts in accordance with the position of the piston relative to the cylinder and by means of ported passages contained in the piston and/or the cylinder.

The primary object of the present invention is to provide an improved, simplified vehicle suspension system of the piston-motor fluid-pressure type, wherein the control of the supply, return or displacement of the fluid is effected automatically by the position of the piston relative to its cylinder. In accordance with a specific feature of the invention, the system is operable to raise a wheel relative to the vehicle chassis, whereby the wheel may be elevated above a fixed supporting surface.

Other objects and advantages of the invention will become apparent from a study of the following specification when considered in conjunction with the accompanying drawing, in which.

Figure 6:
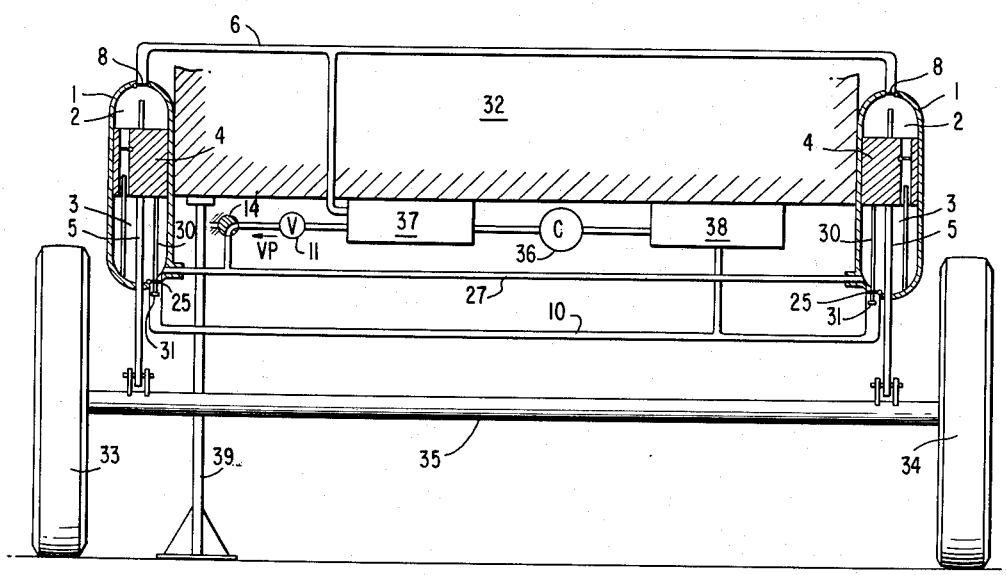

FIGURE 6 schematically represents an arrangement of two suspension elements connected to two front or rear wheels of a vehicle.

Figure 1:
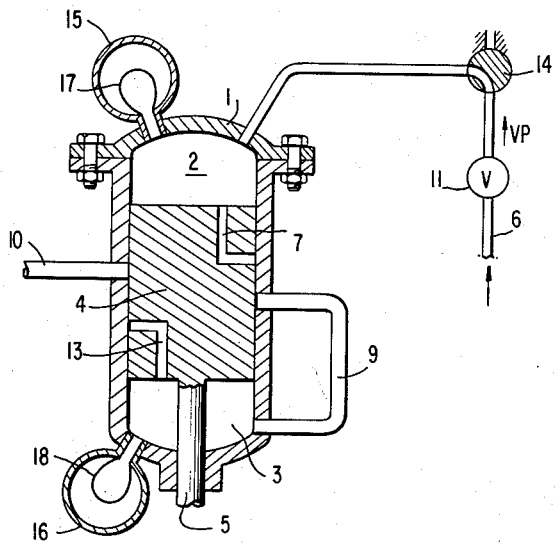
FIGURE 1 is a longitudinal sectional view of a first embodiment of the fluid suspension system of the present invention, said embodiment including single supply and return ducts.

Referring first to FIGURE 1, the cylinder 1 contains a pair of chambers 2 and 3 defined on opposite sides of a double-acting piston 4. Cylinder 1 is connected with the vehicle chassis, and piston 4 is connected with a vehicle wheel by piston rod 5. Pressure fluid is supplied to chamber 2 via supply duct 6 containing adjustable valve 11 (that is adjustable by the operator of the vehicle to vary supply pressure and thereby control the flexibility of the system) and a pet cock valve 14 (that is operable to evacuate or bleed chamber 2). Adjacent its center the cylinder 1 includes an exhaust duct 10 that is normally closed when the piston is in its illustrated position. Piston 4 contains a first port 7 that cooperates with a passage 9 in cylinder 1 to interconnect cylinder chambers 2 and 3 when the piston is lowered from its illustrated position. Piston 4 also contains a second passage 13 that connects lower chamber 3 with exhaust duct 10 when the piston is raised from its illustrated position. The cylinder further includes a pair of fluid tight chambers 15, 16 at each end containing expansible diaphragm elements 17 and 18 that communicate with chambers 2 and 3, respectively, whereby the system constitutes a hydropneumatic or oleopneumatic suspension.

In operation, when the vehicle engine is started and pressure fluid is supplied to upper chamber 2 via duct 6, adjustable valve 11, and bleeder valve 14, the piston 4 is displaced downwardly relative to the cylinder whereby the illustrated position of equilibrium is obtained.

During normal travel of the vehicle, the piston reciprocates slightly in the cylinder, fluid in the chambers 2 and 3 being correspondingly compressed into and removed from the expansible chambers 17 and 18, respectively. During this normal travel, ducts 9 and 10 are maintained closed by the piston 4. In the event that a major shock is imparted to the suspension system during travel, the piston moves upwardly to a greater extent to connect port 13 with duct 10 to evacuate fluid from chamber 3, and downwardly to a greater extent to connect port 7 with passage 9 to admit pressure fluid to chamber 3. This venting and pressurizing of chamber 3 serves to damp out the forces of shock and vibration and to return the piston to its illustrated position of equilibrium.

In accordance with the invention, the system of FIGURE 1 may be used to raise a wheel of a stationary vehicle off the ground. Thus, valve 11 is adjusted by the operator to supply maximum fluid pressure into chamber 2, whereby piston 4 is moved downwardly from its illustrated position to admit pressure fluid to chambers 3 and 18 via port 7 and passage 9. The vehicle chassis is then supported in a fixed manner (for example, by a jack or other "wedge" means), whereupon bleeder valve 14 is opened. The fluid under pressure in chamber 3 then urges piston 4 upwardly relative to its cylinder to lift the associated wheel off the ground. It is apparent that by the above procedure, if the chassis were not supported by jack means or the like, the chassis could be lowered relative to a wheel engaging a fixed support.

Figure 2:
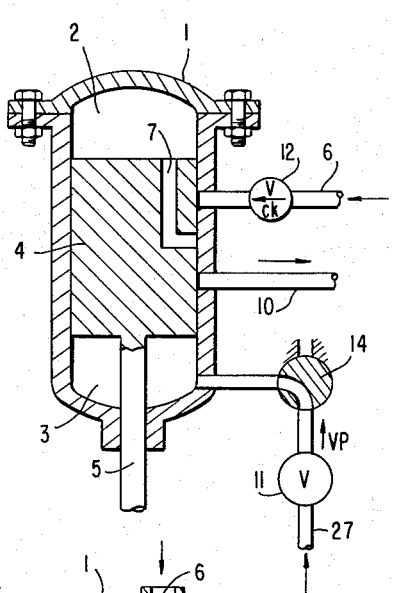
FIGURES 2 and 3 are longitudinal sectional views illustrating second and third embodiments of the invention each including a pair of pressure fluid supply ducts and a single return duct.

Referring now to FIGURE 2 wherein identical elements have been identified by the same reference numerals, the return duct 10 is arranged between vertically-spaced main and secondary pressure supply ducts 6 and 27, respectively. Secondary supply duct 27 communicates directly with lower chamber 3 and includes the bleeder valve 14 and the adjustable valve 11. Main supply duct 6, which contains non-return valve 12, is blocked by the piston 4 when the system is in the illustrated position of equilibrium. Piston 4 contains a port 7 for connecting duct 6 with chamber 2 when the piston is moved upwardly from the illustrated position, and for connecting duct 10 with chamber 2 when the piston is moved downwardly from its illustrated position.

The operation of the embodiment of FIGURE 2 is analogous to the system of FIGURE 1. Thus, when the vehicle is in normal operation and the suspension system is in the illustrated condition of equilibrium, road shocks and vibration imparted to the vehicle wheel cause the piston to reciprocate slightly within the cylinder. Upon the impartation of a major shock force to a wheel, the amplitude of reciprocation of the piston is increased and when the piston moves downwardly by a greater extent, chamber 2 is vented via port 7 and duct 10, and the pressure fluid in chamber 3 tends to move the piston upwardly toward the illustrated equilibrium position. Similarly, when the piston moves upwardly to a greater extent, pressure fluid is supplied to chamber 2 via duct 6, valve 12 and port 7, whereby the piston is urged downwardly toward the illustrated position. Consequently the system is operable to damp out the large vibrations that result from major road shock forces. The flexibility of the system may be controlled by appropriate adjustment of valves 11 and 12.

Assuming that chamber 2 contains fluid under pressure and that it is desired to raise a wheel of a stationary vehicle, bleeder valve 14 is opened to drain chamber 3, whereupon the cylinder moves upwardly relative to the piston to elevate the chassis. Upon placing a fixed support beneath the chassis, the valve 14 is closed and the valve 11 is adjusted to admit fluid at maximum pressure to chamber 3. Consequently, piston 4 is displaced upwardly to lift the wheel from the ground.

Figure 3:
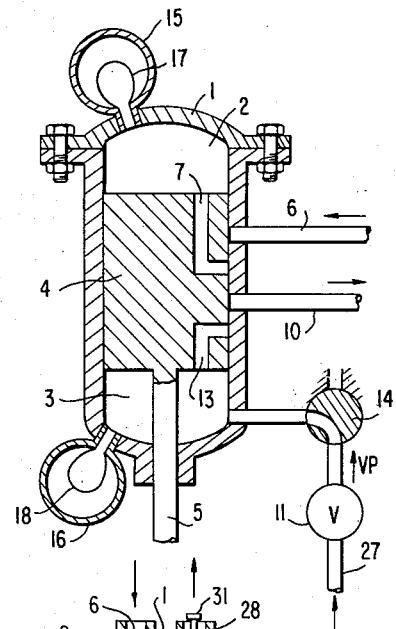

The modification of FIGURE 3 includes a combination of the expansible chamber means 17 and 18 of the FIGURE 1 embodiment with the supply and return duct arrangement of the FIGURE 2 embodiment. Consequently, the arrangement of FIGURE 3 constitutes an oleo-pneumatic suspension. The piston 4 includes, in addition to the port 7, a second port 13 for venting chamber 3 when the piston 4 moves upwardly to a greater extent during the impartation of major shock forces to the system. As in the embodiment of FIGURE 2, port 7 vents the upper chamber 2 when the piston moves downwardly to a greater extent during vehicular travel over a rough road. The lifting of a wheel in the embodiment of FIGURE 3 is accomplished as described above with reference to FIGURE 2.

Figure 4:
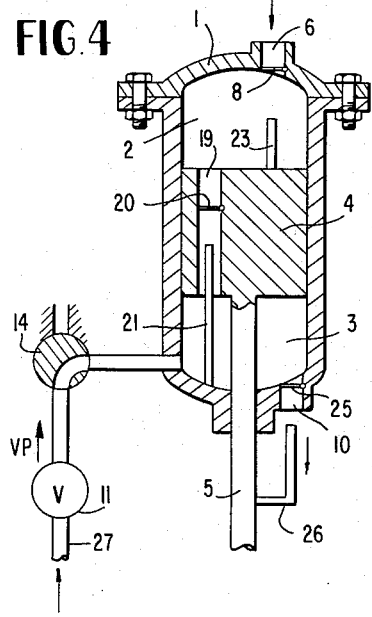
FIGURE 4 is a longitudinal sectional view of the preferred embodiment of the invention including a pair of supply ducts communicating with the cylinder chambers, respectively, and a single return.

Referring now to the embodiment illustrated in FIGURE 4, a first supply duct 6 communicates with upper chamber 2 via a clack or non-return valve 8, and a secondary supply duct 27 containing pressure-adjusting valve 11 and bleeder valve 14 communicates with lower chamber 3. Piston 4 is provided with a through passage 19 containing a clack or non-return valve 20 that is operable by a finger 21 secured to the lower portion of cylinder 1. A finger 23 is secured to the upper portion of piston 4 for opening clack valve 8, and finger 26 is carried by rod 5 for opening a clack valve 25 mounted in the lower portion of cylinder 1. As is obvious from the drawing and from the foregoing description, in the event that a major shock causes extensive upward travel of the piston, valves 8 and 25 are opened by fingers 23 and 26, respectively, whereupon chamber 3 is vented and pressure fluid is admitted to chamber 2 to urge piston 4 downwardly to the illustrated equilibrium position. In the event that the piston moves downwardly to a greater extent, clack valve 20 is opened by finger 21, whereby the chambers 2 and 3 are in communication and the piston moves upwardly toward the illustrated position.

From the foregoing description, it is obvious that by appropriate control of bleeder and adjustable valves 14 and 11, respectively, the system may be operated to elevate a wheel relative to the ground as in the previously described embodiments.

Figure 5:
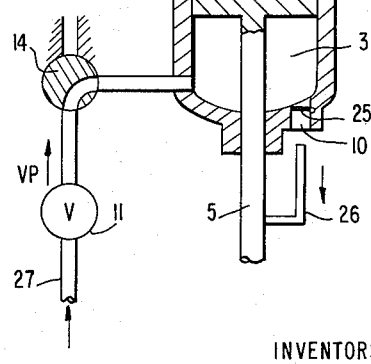
FIGURE 5 is a longitudinal sectional view of another embodiment of the invention including pairs of supply and return ducts communicating with the cylinder chambers, respectively.

In the modification of FIGURE 5, the system includes a clack valve 29 that is operable by the head portion 31 of a finger 30 carried by the piston 4 to effect communication between the upper chamber and exhaust duct 28. Consequently, lower chamber 3 is vented by finger 26 when the piston 4 travels upwardly to a greater extent, and the upper chamber is vented by head portion 31 when the piston travels downwardly to a greater extent, thus achieving return of the piston to its illustrated equilibrium position.

In the foregoing specification and accompanying drawing, pressure adjusting valve 11 is of the conventional "mano-escape-valve" type that is operable to adjust the fluid supply pressure to a given value.

There has been shown in FIG. 6 an arrangement of two elements of suspension according to the embodiment of FIG. 4, except that valve 25 in return duct 10 is operated by piston attached finger 30 and head 31 as per FIG. 5, mounted on a chassis 32 of a vehicle provided with wheels 33 and 34.

In this example, the cylinders 1 are secured to the chassis while the pistons 4 are connected to the wheel axle 35 by means of piston rods.

The pressurized fluid source consists of a compressor 36 supplying a tank 37.

Said tank is provided with two outlets one of which is connected to compression chambers 3 by means of conduit 27 which comprises release valve 11 and petcock 14, while the other comprises the secondary supply conduits 6 for feeding compression chambers 2.

The compression chambers 3 also comprise an evacuation conduit 10 which returns the fluid through a tank 38 to the inlet of compressor 36 for re-compression.

Also in FIG. 6 is shown a jack, support, or spacer 39 positioned to support the chassis 32 of the vehicle to enable one of the wheels to be raised for repair in the manner previously explained.

While in accordance with the provisions of the patent statutes, the preferred and alternate embodiments of the invention have been illustrated and described, it will be apparent to those skilled in the art that changes and modifications may be made in the apparatus described without deviating from the invention set forth in the following claims.

What is claimed is:

1. A fluid suspension system for motor vehicles having a chassis and a plurality of wheels, comprising
    a cylinder adapted for connection with said chassis;
    a piston slidably mounted in said cylinder, said piston carrying at one end a piston rod that extends through said cylinder for connection with a wheel, said piston defining first and second chambers at opposite ends of said cylinder, said piston containing a through passage for affording communication between said chambers;
    main supply duct means for supplying pressure fluid directly to said first chamber, said main supply duct means including pressure-adjusting valve means for varying the flexibility of the suspension system;
    secondary supply duct means for supplying pressure fluid to said second chamber, said secondary duct means including a first normally-closed one-way valve;
    a return duct connected with said first chamber and including a second normally-closed one-way valve;
    a third normally-closed one-way valve in said piston passage;
    first and second finger means carried by said piston and said rod, respectively, for opening said first and second one-way valves only when said piston is displaced in a direction reducing the volume of said second chamber beyond a predetermined limit; and
    third finger means carried by said cylinder for opening said third one-way valve only when the piston is displaced in the opposite direction to reduce the volume of said first chamber beyond a predetermined limit.

2. A fluid suspension system for a motor vehicle, comprising a cylinder adapted for connection to a vehicle part, a piston slideably mounted in said cylinder and adapted for connection to another vehicle part, said piston defining on opposite sides thereof first and second compression chambers in said cylinder, a source of pressure fluid at greater than atmospheric pressure, a normally open, first supply duct connecting said source of pressure fluid to said first compression chamber, a second supply duct opening into said second compression chamber and arranged to admit pressure fluid from a source also at greater than atmospheric pressure, said second supply duct being normally closed when said piston is in an equilibrium position between said compression chambers, means for opening said second supply duct controlled by movement of said piston from its equilibrium position in one direction, a return duct connected to one of said compression chambers for exhausting fluid therefrom, means normally closing said return duct, means for opening said return duct controlled by movement of said piston from its equilibrium position in the other direction, and a manually operable variable pressure valve in said first supply duct for varying the pressure of fluid in said first compression chamber and thereby varying the flexibility of the suspension system.

3. A fluid suspension system according to claim 2 wherein said second supply duct comprises a U-shaped pipe mounted on said cylinder and opening at one end into said second compression chamber and at the other end into an intermediate portion of the cylinder so as to be blocked by said piston when in its equilibrium position, said means for opening the second supply duct comprising a first passage in said piston arranged to register with said blocked end of the pipe and communicate the second supply duct with the first compression chamber upon movement of the piston in said one direction, and said means for opening said return duct comprises a second passage in the piston arranged to communicate the return duct with said one compression chamber upon movement of the piston in said other direction.

4. A fluid suspension system according to claim 2 wherein said second supply duct is normally closed by said piston when in its equilibrium position and also by a check valve for preventing evacuation of fluid from said second chamber when the piston moves from the equilibrium position in said one direction.

5. A fluid suspension according to claim 2 wherein said means for opening the second supply duct comprises a first passage in the piston communicating the second supply duct with the second compression chamber when the piston moves from its equilibrium position in said one direction, and said means for opening the return duct comprises a second passage in the piston arranged to communicate the return duct with said one compression chamber when the piston moves in the other direction.

6. A fluid suspension according to claim 2 wherein is provided a second return duct connected to the other of said compression chambers, a normally closed valve located in said second return duct, and means affixed to the piston for engaging said normally closed valve to open it upon movement of the piston from its equilibrium position in said one direction.

7. A fluid suspension system in accordance with claim 2 wherein is provided a petcock in said first supply duct for obturating the duct and communicating the first compression chamber with the atmosphere to permit raising of the vehicle wheel associated with said cylinder.

8. A fluid suspension system according to claim 2 wherein said second supply duct comprises a passage through said piston communicating the first and second compression chambers with each other, a check valve in said passage normally closed when said piston is in equilibrium, said means for opening said second supply duct comprising an element affixed to said cylinder and enterable into said passage to engage and open said valve on movement of the piston in said one direction.

References Cited by the Examiner

UNITED STATES PATENTS

| 820,707 | 5/06 | Downer. | |
| 1,036,340 | 8/12 | Rockwell. | |
| 1,105,805 | 8/14 | Liebowitz. | |
| 2,338,896 | 1/44 | Boulogne. | |
| 2,443,433 | 6/48 | Sanmori. | |
| 2,743,941 | 5/56 | Walker | 280—112 |
| 2,812,193 | 11/57 | Grace | 280—150.5 |
| 2,934,354 | 4/60 | Vogel | 280—112 |

A. HARRY LEVY, *Primary Examiner.*

PHILIP ARNOLD, *Examiner.*